June 3, 1930.  F. A. BALLOU, JR  1,761,187
COMBINED PIN STEM, JOINT, AND CATCH
Filed Feb. 23, 1929
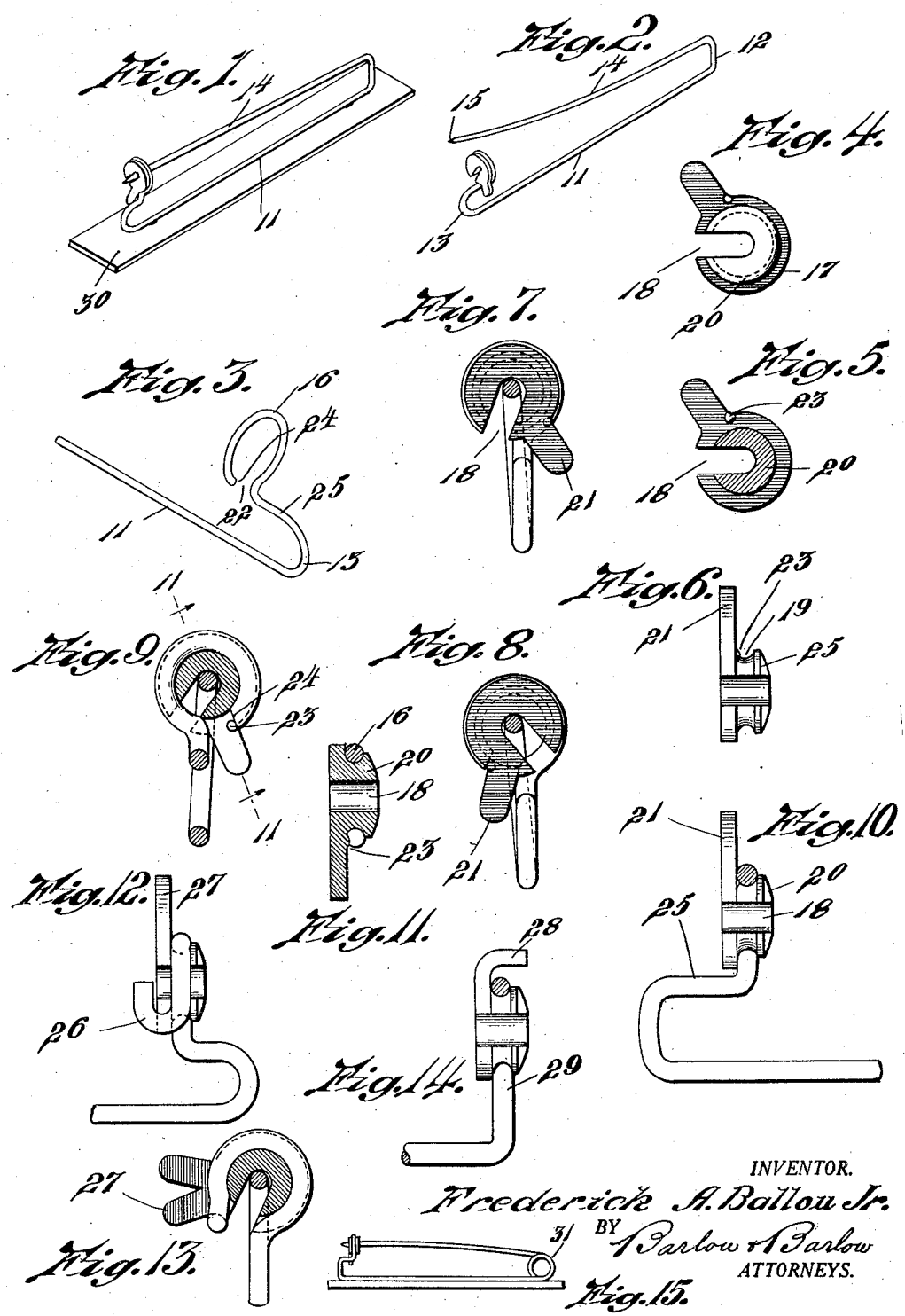
INVENTOR.
Frederick A. Ballou Jr.
BY Barlow & Barlow
ATTORNEYS.

Patented June 3, 1930

1,761,187

UNITED STATES PATENT OFFICE

FREDERICK A. BALLOU, JR., OF PROVIDENCE, RHODE ISLAND, ASSIGNOR TO B. A. BALLOU & CO., INC., OF PROVIDENCE, RHODE ISLAND, A CORPORATION OF RHODE ISLAND

COMBINED PIN STEM, JOINT, AND CATCH

Application filed February 23, 1929. Serial No. 342,150.

This invention relates to a pin stem and safety catch therefor; and has for its object to provide a construction which shall comprise the pin stem, a suitable joint therefor and a catch, all mounted in a single unit for assembly on a bar pin, badge or any other desired article.

A further object of the invention is the bending of a wire into a shape to form a base portion for attachment to the desired article, a pin stem and a catch for rotatably holding a keeper to releasably lock the pin stem in its catch against accidental removal.

With these and other objects in view, the invention consists of certain novel features of construction, as will be more fully described, and particularly pointed out in the appended claims.

Fig. 1 is a perspective view of the unit pin stem base and safety catch in assembled position on the back of a bar pin.

Fig. 2 is a perspective view of the assembly with the pin stem in disengaged position from its catch.

Fig. 3 is a perspective view of the base with the wire extending therefrom to form the catch and journal for the rotary keeper.

Fig. 4 is a side elevation of the keeper.

Fig. 5 is an elevation of the opposite side of the keeper.

Fig. 6 is an edge view thereof.

Fig. 7 is an end view of the assembled device showing the keeper in unlocked position.

Fig. 8 is a view similar to Fig. 7 showing the keeper in locking position.

Fig. 9 is a sectional view through a portion of the keeper in the position shown in Fig. 7, looking in the direction opposite to that shown in Fig. 7.

Fig. 10 is a fragmental side view of the device partially in section showing the keeper mounted in its bearing.

Fig. 11 is a section on line 11—11 of Fig. 9.

Fig. 12 is a view similar to Fig. 10 of a modified construction of rotor and catch.

Fig. 13 is a section through the rotor of Fig. 12 in its mounted position with a slot aligning with the hook opening of the catch.

Fig. 14 is a still further modified view illustrating the rotor with one of the ears folded over the wire to serve as a stop upon this portion engaging the wire for the aligning of the slot and opening in the catch for insertion of the pin stem.

Fig. 15 is a side elevation illustrating a further modification with a coiled portion to increase the resiliency of the pin stem.

It is usual in the construction of bar pins to use a pin stem and joint and a separate safety catch for the pointed end of the pin stem, each of which two parts is soldered to the back of the bar pin in spaced relation for their cooperative use. This necessitates the handling of two parts and skilled labor for aligning these separate parts that they may properly operate together. By the present construction, I have formed a pin stem and safety catch in one assembled unit with an enlarged surface for attaching the same to a bar pin or badge, the parts being in proper spaced and aligned relation, whereby unskilled labor is required for attaching the same to a bar pin or other article, and but a single unit is necessary to be handled; and the following is a detailed description of the present embodiment of this invention illustrating the preferred means by which these advantageous results may be accomplished:

A wire of suitable dimension is bent as illustrated in Fig. 2 to form a base 11 with substantially right angularly projecting portions 12 and 13 with a pin stem 14 extending from the portion 12 suitably pointed at one end 15 for piercing a textile fabric or the like to which the device may be inserted. The portion 13 although generally right angularly disposed to the base 11 is offset and formed into a hook 16 to act as a catch to receive the point end of the pin stem 14, thus providing what is known generally as a safety pin type of construction. The hook portion 16 is formed on the arc of a circle and has mounted therein a rotary keeper 17 having a radial slot 18 therein and a hub 20 with an annular grooved peripheral edge 19 for the reception of the wire hook or catch 16 which is bent snugly around the hub 20 of the keeper and lies within the groove 19 to prevent its lateral displacement from the hook.

A fingerpiece 21 extends from the keeper 17 for manual engagement to rotate the same and cause the slot 18 of the keeper to align with the opening 22 of the hook or catch for reception of the pin stem 14 after which the keeper may be rotated by means of the fingerpiece 21 to move its slot 18 out of alignment with the hook opening, as is illustrated in Fig. 8, to securely lock the pin stem 14 from removal.

A detent 23 is formed on the keeper 17 in a position to snap over the end 24 of the wire hook and resiliently and releasably secure the keeper against accidental rotation to release position. The fingerpiece 21 and slot 18 are so related that the slot 18 will align with the opening 22 in the hook when the finger piece is in engagement with the reversely bent or offset portion 25 which forms a stop to limit its rotation.

In the modification of Figs. 12 and 13 the stop to limit the rotation of the keeper and cause the slots 18 and 22 to align is formed from the wire catch by a reversely bent portion 26 which engages the fingerpiece 27 and limits its movement beyond this point, or with still further modification of Fig. 14 the stop consists of an ear 28 extending from the keeper and partially rolled or folded about the hook-shaped catch to engage the shank portion 29 thereof for limiting the movement of the keeper in this direction. Of course, in this latter instance, the slot of the rotor may be positioned in a different place than shown in views 1 to 10 relative to the fingerpiece, the slot being positioned at any point in the keeper that will accomplish the desired results.

In some constructions where increased resiliency of the pin stem is required, I form coils 31 in the wire, as illustrated in Fig. 15.

The base 11 of the unit may be soldered to an ornamental bar 30 at the desired point whereby one soldering operation serves to secure the pin stem and its mounting and safety catch in position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A device of the safety pin type of construction having an integral pin stem and catch, a rotatable keeper and means to rotatably mount said keeper with its axis substantially that of the pin stem in locked position in said catch to releasably secure said pin stem therein.

2. A base with substantially right angularly extending portions from each end thereof, a pin stem extending from the end of one of said portions, a rotatable keeper with a radial slot and a grooved periphery, the other of said portions forming a catch and being bent to lie in said grooved periphery to rotatably mount said keeper therein, said pin stem being held in locked position in a certain position of the slot on said rotatable keeper.

3. A device of the character described, comprising a wire pin stem pointed at one end, the opposite end of the wire folded upon itself to form a base extending substantially parallel to said pin stem in the same plane therewith and of a length greater than said pin stem, a portion of the wire extending from said base having a hook end to form a catch for said pointed end of the pin stem to secure it in position, and a rotor keeper having a radial slot and a hub grooved on its peripheral edge to receive the hook catch to rotatably mount the keeper therein, a finger-engaging ear extending from said keeper, cooperating means between said keeper and said catch to limit the rotation of said keeper in a position to align the slot with the opening in said hook for reception of the pointed end of the pin stem.

4. A base with substantially right angularly extending portions from each end thereof, a pin stem extending from the end of one of said portions, a rotatable keeper with a radial slot and a grooved periphery, the other of said portions forming a catch and being bent to lie in said grooved periphery to rotatably mount said keeper therein.

5. A device of the character described, comprising a wire pin stem pointed at one end, the opposite end of the wire folded upon itself to form a base extending substantially parallel to said pin stem in the same plane therewith, a portion of the wire extending from said base having a hook end to form a catch for said pointed end of the pin stem to secure it in position, and a rotor keeper having a radial slot and a hub grooved on its peripheral edge to receive the hook catch to rotatably mount the keeper therein.

6. A device of the character described, comprising a wire pin stem pointed at one end, the opposite end of the wire folded upon itself to form a base extending substantially parallel to said pin stem in the same plane therewith, a portion of the wire extending from said base having a hook end to form a catch for said pointed end of the pin stem to secure it in position, a rotor keeper, and means in the catch to rotatably mount the keeper to operate in a plane at right angles to the pin stem.

In testimony whereof I affix my signature.

FREDERICK A. BALLOU, Jr.